United States Patent [19]
Plantan et al.

[11] Patent Number: 5,632,192
[45] Date of Patent: May 27, 1997

[54] SPRING BRAKE ACTUATOR WITH INDICATOR FOR FULLY RELEASED CONDITION

[75] Inventors: Ronald S. Plantan, Charlotte; Emmett S. Davis, Gastonia, both of N.C.

[73] Assignee: Indian Head Industries, Inc., Charlotte, N.C.

[21] Appl. No.: 574,611

[22] Filed: Dec. 19, 1995

[51] Int. Cl.⁶ .............................. F01B 25/26; F01B 7/00
[52] U.S. Cl. ...................... 92/5 L; 92/15; 92/63
[58] Field of Search ................ 92/5 R, 63, 15, 92/5 L; 91/1

[56] References Cited

U.S. PATENT DOCUMENTS

| | | | |
|---|---|---|---|
| 3,117,496 | 1/1964 | Dobrikin | 92/63 |
| 3,508,470 | 4/1970 | Swander et al. | 92/63 |
| 3,782,251 | 1/1974 | Le Marchand | 92/63 |
| 4,945,818 | 8/1990 | Ware | 92/5 R |
| 5,002,164 | 3/1991 | Bowyer | 92/5 R |

FOREIGN PATENT DOCUMENTS

| | | | |
|---|---|---|---|
| 0315395 | 5/1989 | European Pat. Off. | 92/63 |
| 2209570 | 9/1972 | Germany | 92/63 |
| 2414051 | 10/1974 | Germany | 92/63 |
| 1464726 | 2/1977 | United Kingdom | 92/63 |

*Primary Examiner*—Thomas E. Denion
*Attorney, Agent, or Firm*—Howard & Howard

[57] ABSTRACT

A unique indicator system is incorporated into a release tool for a spring brake actuator. The indicator provides an indication of when the release tool has is fully released. The release tool is preferably of the type wherein a threaded member does not extend outwardly of the actuator during caging of the power spring. The inventive indicator is biased outwardly of the actuator when the release bolt has even partially caged the power spring. It is only when release bolt is fully released that the indicator is pulled inwardly. Thus, an observer has a visual indication of when the power spring caging mechanism has been fully released.

20 Claims, 4 Drawing Sheets

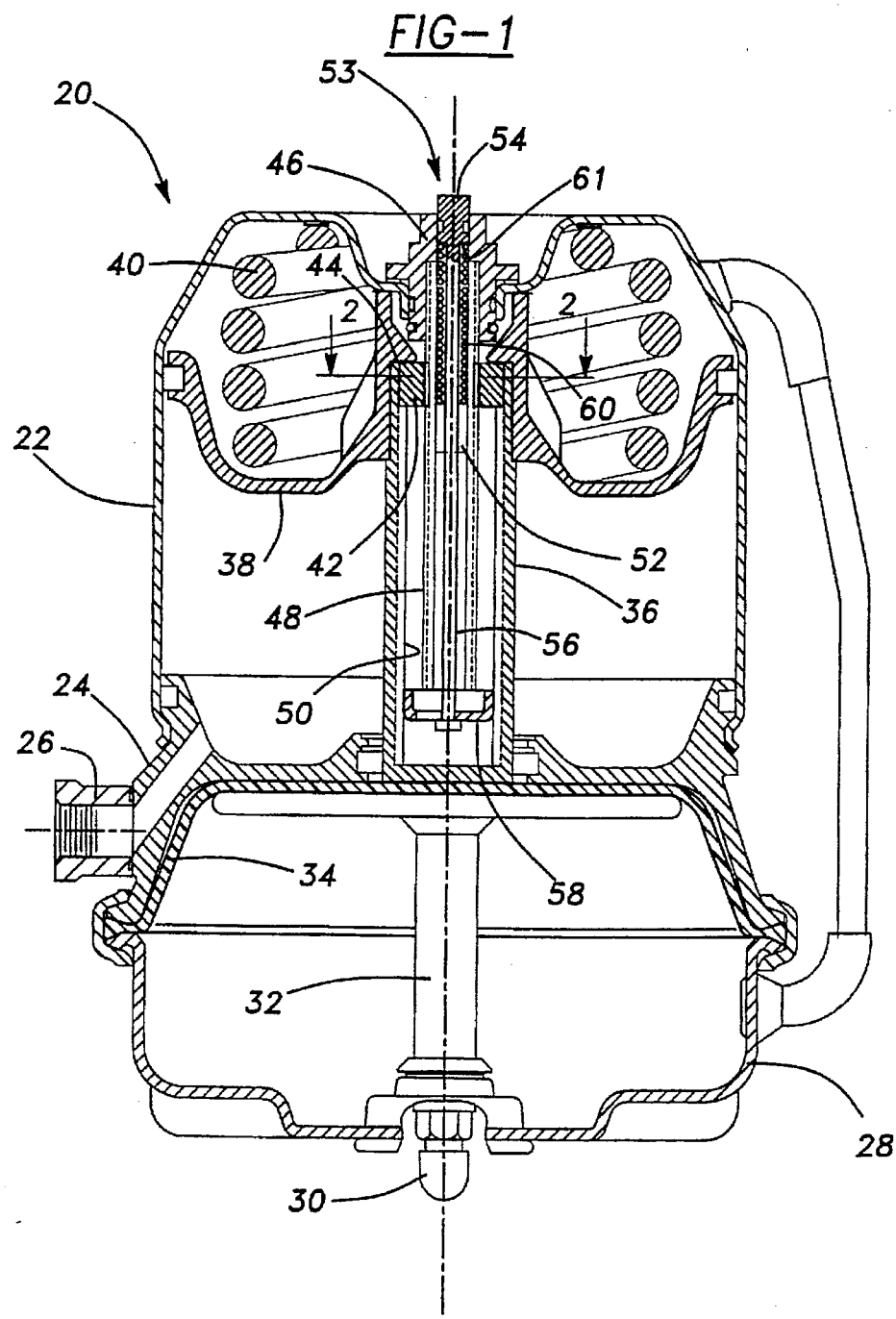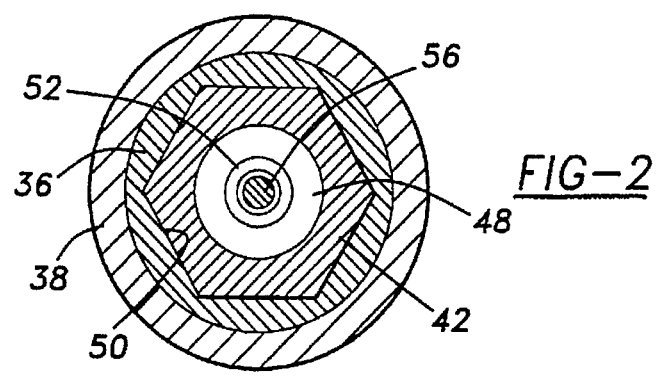

5,632,192

SPRING BRAKE ACTUATOR WITH INDICATOR FOR FULLY RELEASED CONDITION

BACKGROUND OF THE INVENTION

This application relates to a spring brake actuator wherein an indicator is provided to show when the power spring release mechanism is fully released allowing the power spring to fully expand.

In the prior art, spring brake actuators typically include an emergency or parking side enclosing a strong power spring. The emergency side selectively actuates a second pushrod in the service side of the brake actuator to set a brake. The service side is normally operated by air pressure to move its pushrod and set the brake. Under certain conditions, the emergency side may actuate the pushrod in the service side. One of those conditions would be a failure in the air system for the brake. Upon a failure of the air system, the power spring moves to set the pushrod. This locks the brake, preventing movement of the vehicle.

Under such conditions, a driver typically must cage the power spring to low the vehicle to be move. In the majority of the prior art actuators, a release bolt is associated with the spring brake actuator housing. The release bolt is moved into the emergency chamber, and pulls a threaded plate outwardly to capture or cage the power spring. In addition to these emergency situations the caging process is often utilized for shipment, repair, or other situations where the actuator is out of use for a period of time. The prior art release bolts have typically extended outwardly of the housing a significant distance to begin caging the power spring.

In addition, so-called integral release bolts have been received in the brake actuator housing. The integral release bolts are typically turned and move outwardly of the housing as they cage the power spring.

More recently, proposals have been made for a release tool that does not move outwardly of the brake actuator as it cages the power spring. The brake actuators are typically mounted beneath vehicles, and are often in a crowded space. The mounting of the brake actuator relative to other structure on the vehicle is such that there is often not enough room for the release bolt to extend outwardly of the brake actuator. At least one proposed brake actuator has included a structure wherein the release tool does not extend outwardly of the housing as the power spring is caged. Such a structure is disclosed in U.S. patent application Ser. No. 08/515,239, filed Aug. 15, 1995. In this structure, which is owned by the Assignee of the present application, and which includes one co-inventor, a threaded bolt is turned in the outer housing of the brake actuator. The threaded bolt moves a nut within the brake actuator axially towards an outer end of the brake actuator. The nut abuts and begins to move a structure which cages the power spring. The release tool, here the threaded bolt, does not move outwardly of the brake housing. Thus, there is no additional space required outwardly of the brake actuator for caging the power spring.

With such structures, new challenges arise. In the prior art release bolts, one typically knew when the spring was fully released. In particular, if a separate release bolt was removed from the brake actuator, then the power spring was fully released. When an integral release bolt was used, one knew the release bolt had fully released the power spring when the bolt abutted the outer housing.

With the recent inventions of internal release tools that do not move outwardly of the housing, however, the possibility does exist of the release tool not fully releasing the power spring release mechanism. If the power spring is not fully released, then the stroke of the emergency side is reduced, which may be undesirable.

SUMMARY OF THE INVENTION

In a disclosed embodiment of this invention, a spring brake actuator is provided with an indicator that gives an indication of when the power spring release mechanism is fully released. For purposes of this application, the fully released position will be described as the power spring being fully released. It should be understood that even when the power spring is fully released, it could be held upwardly by air pressure. By the "fully released" position in this application, applicant merely means to indicate that the power spring caging mechanism no longer prevents full expansion of the power spring. In a preferred embodiment, the indicator extends outwardly of the brake actuator when the power spring is not fully released, and is pulled back inwardly upon full release of the power spring.

In a most preferred embodiment, the indicator is incorporated into a release tool such as disclosed in the above-referenced patent application wherein an outer bolt drives an inner nut to cage the power spring. Most preferably, the indicator is an elongate member received within the threaded bolt. A spring biases the indicator outwardly. When the nut is at its lowermost position, fully releasing the power spring, it pulls the indicator inwardly such that the indicator does not extend outwardly of the housing.

The indicator is preferably formed of a bright color such that an observer can easily see whether the indicator does extend outwardly of the housing, and will have an indication of whether the power spring is fully released. Most preferably, a stop for the spring is provided within the bolt, and the indicator spring reacts off the stop to force the indicator outwardly when the nut is not pulling the indicator inwardly against the force of the indicator spring.

These and other features of the present invention will be best understood from the following specification and drawings, of which the following is a brief description.

BRIEF DESCRIPTION OF THE DRAWINGS

FIG. 1 is a cross-sectional view through an inventive spring brake actuator.

FIG. 2 is a cross-sectional view along line 2—2 as shown in FIG. 1.

DETAILED DESCRIPTION OF PREFERRED EMBODIMENT

Figure 3:
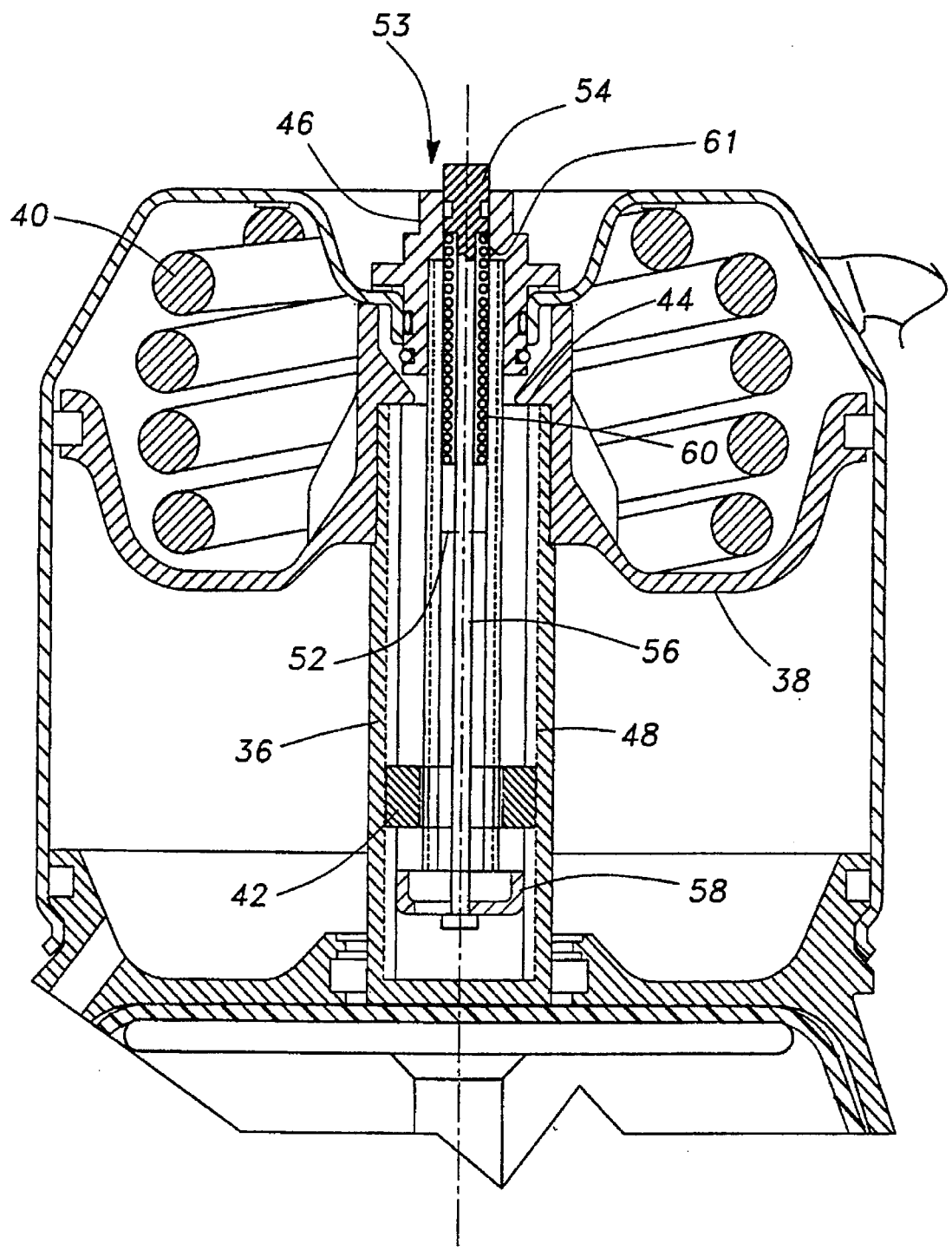
FIG. 3 is a partial view of a spring brake actuator incorporating the present invention.

FIG. 1 shows a spring brake actuator 20. An outer housing 22 is connected to a central housing 24. An air port 26 supplies air to an internal emergency chamber defined between housing members 22 and 24. A service chamber housing 26 defines a service chamber with central housing 24. An air port, not shown, delivers pressurized air to the service chamber. A connection member 30 is driven by a pushrod 32 to set a brake system. A diaphragm 34 is forced downwardly when air pressure is delivered to the chamber above the diaphragm, thus moving the pushrod 32 to set the brake. A hollow pushrod 36 is formed in the upper or emergency chamber of the brake actuator. The pushrod 36 moves with an actuator member 38. In the illustrated embodiment, actuator member 38 is a piston, however it should be understood that the actuator member could be a piston plate, and that a diaphragm may also be utilized on the emergency side as is known in the art.

A power spring 40 forces the actuator member 38 and pushrod 36 downwardly. When the power spring forces the pushrod 36 downwardly, it moves pushrod 32 outwardly to set the brake. The operation of these aspects of a brake actuator are as known in the prior art and form no part of this invention.

As disclosed in the above-referenced patent application, an internally threaded nut 42 is moveable axially within the emergency chamber to contact a ledge surface 44 associated with actuator 38 and pull actuator 38 upwardly to cage power spring 40. As described in more detail in the above-referenced patent application, an outer member 46 may be rotated to turn bolt 48. Nut 42 is threadably received on bolt 48, and moves axially as member 46 is rotated. An internal surface 50 of the pushrod 36 conforms to the outer periphery of the nut 42. Thus, nut 42 may move axially within the pushrod 36, but cannot rotate. Since nut 42 is constrained against rotation, it moves axially when bolt 48 rotates. A stop 52 is formed within bolt 48. An indicator 53 has a head 54 extending outwardly of threaded member 46 in the caged position shown in FIG. 1. In this location, the indicator head 54 provides an indication that the power spring is not fully released. Most preferably, indicator 53 will be of a bright color such that an observer can easily see the head 54 extending outwardly, and will know that the power spring has not been fully released, and thus that the brake actuator 20 is not fully operational.

Indicator head 54 is connected by an extension arm 56 to a cup 58. Extension arm 56, cup 58 and head 54 move as a single unit. A small spring 60 reacts off of stop surface 52, and a neck surface 61 between head 54 and extension 56. Spring 60 biases head 54 outwardly as shown in FIG. 1.

As shown in FIG. 2, the extension 56 is at a central portion of the brake actuator and is surrounded by the bolt 48. Stop surface 52 is a ledge extending slightly radially inwardly from the inner bore of the bolt 48. Nut 42 surrounds bolt 48, and, as shown, the inner bore 50 of the pushrod 34 corresponds to the outer circumference of the nut 42. As also shown, the pushrod 36 and actuator structure 38 surround all of these members, and move as a unit.

As shown in FIG. 3, the threaded member 46 has been turned to drive the nut 42 inwardly. Thus, nut 42 no longer contacts surface 44. Air pressure beneath the actuator member 38 still holds the actuator member 38 upwardly in this figure. However, while the nut 42 was moved downwardly from the FIG. 1 position, it has not moved downwardly a sufficient distance such that the power spring 40 is fully released. If the power spring 40 would begin to expand and move the actuator member 38 downwardly, eventually surface 44 could contact the nut 42, preventing further movement and expansion of the power spring 40. This would be undesirable.

As shown, in this condition where the nut 42 has not been moved to fully release the power spring 40, the spring 60 still biases the indicator head 54 outwardly. Thus, an observer would have an indication that the spring 40 has not yet been fully released. Absent this indicator, a worker who has moved nut 42 to the FIG. 3 position might believe the power spring 40 has been fully released.

Figure 4:
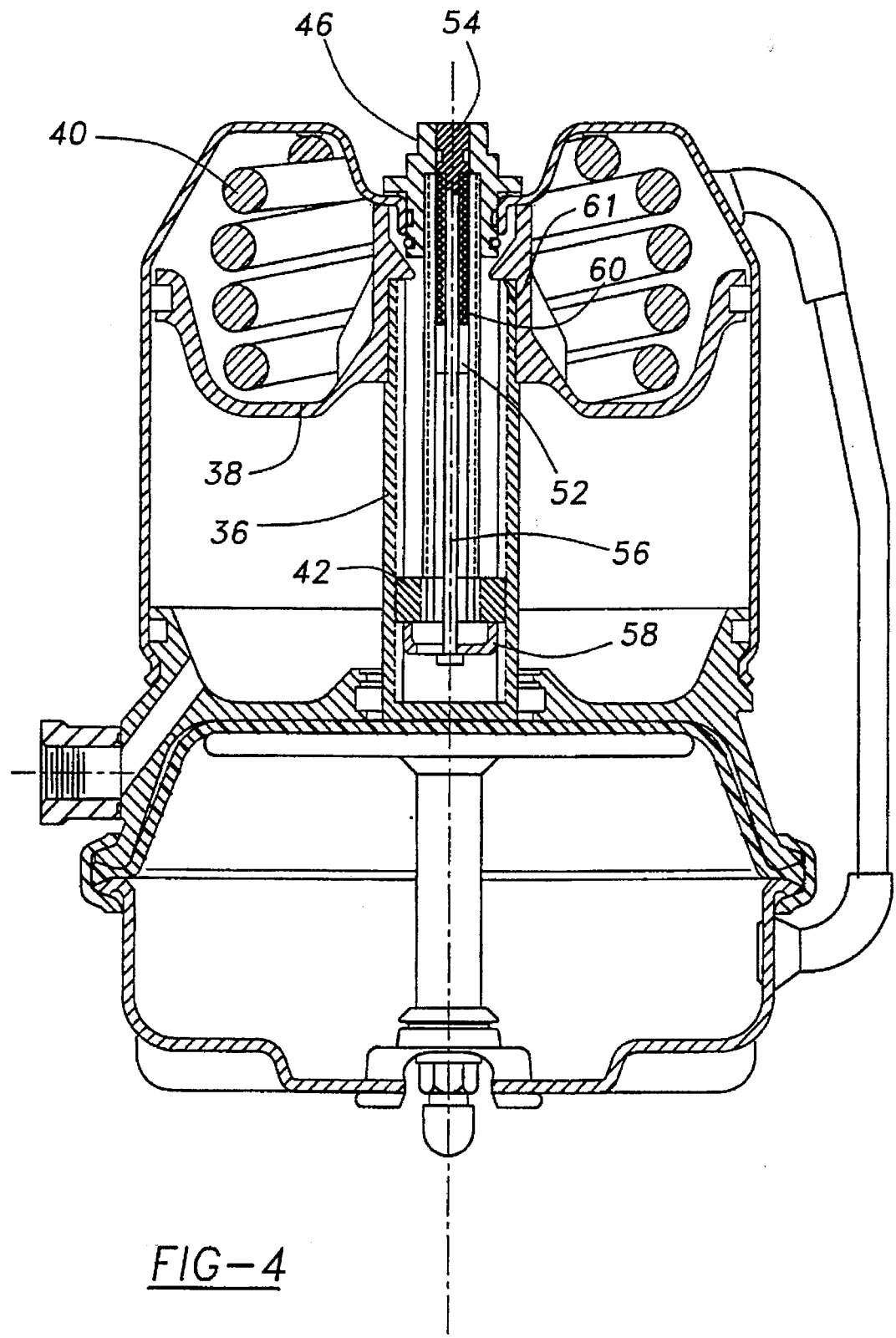
FIG. 4 is a partial view of a spring brake actuator incorporating the present invention.

FIG. 4 shows a condition wherein the nut 42 has moved slightly downwardly from the position shown in FIG. 3. This is the fully released position. In this position, the nut 42 has contacted and pulled the cup 58 inwardly. As cup 58 is moved inwardly by the nut 42, it pulls extension 56 and indicator head 54 inwardly compressing the spring 60. Now, with the nut 42 moved to fully release the power spring 40, the indicator head 54 no longer extends outwardly of the brake actuator. An observer would now have an indication that the spring has been fully released.

Figure 5:
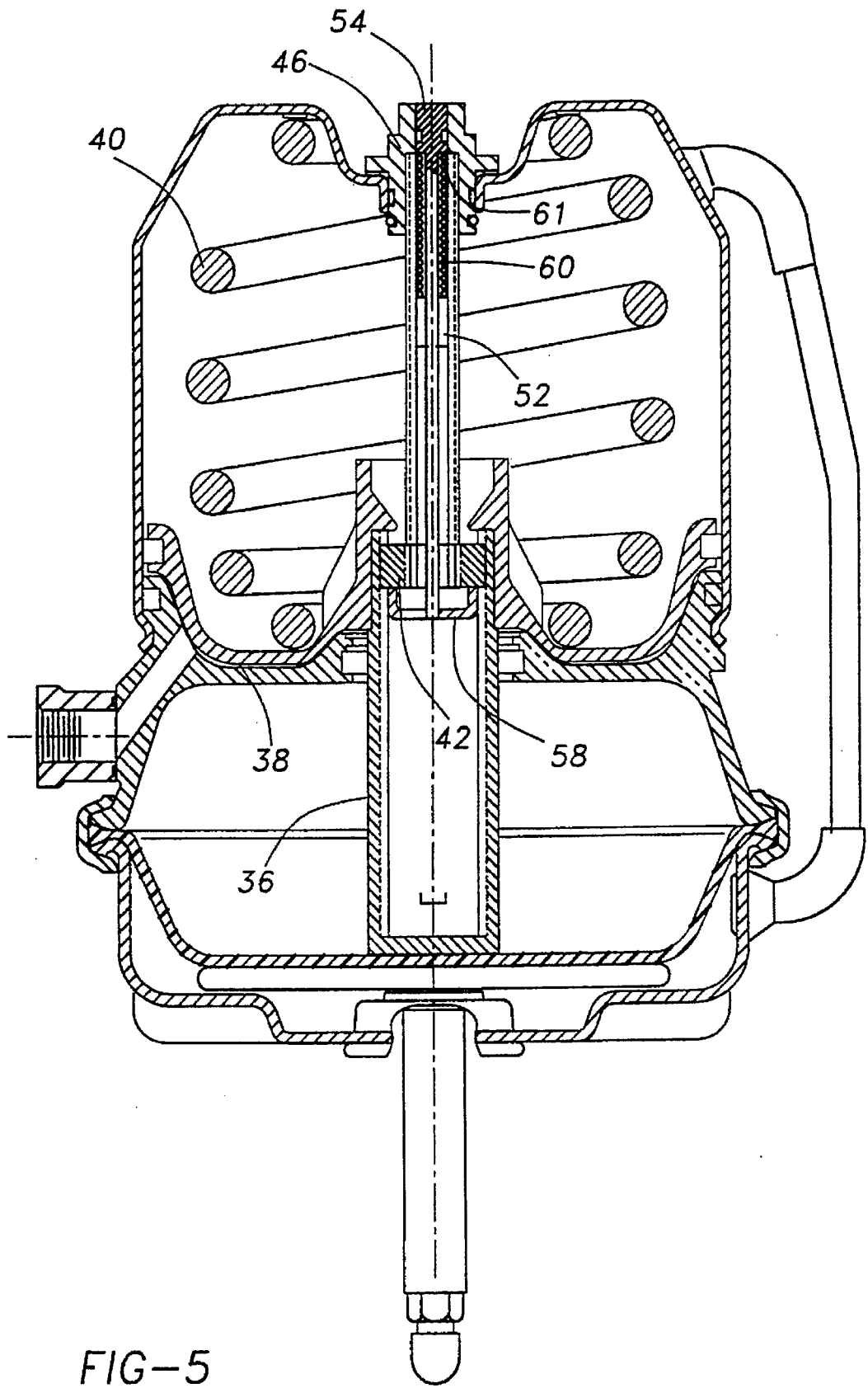
FIG. 5 is a partial view of a spring brake actuator incorporating the present invention.

As shown in FIG. 5, with the spring fully released, the actuator member 38 is able to move downwardly to the full extent of its stroke. An observer will know the brake can expand to this full stroke due to the indicator. To provide an observer with the inventive indication is important benefit.

Although a preferred embodiment of this invention has been disclosed, a worker of ordinary skill in the art would recognize that certain modifications would come within the scope of this invention. For that reason, the following claims should be studied to determine the true scope and content of this invention.

We claim:

1. A spring brake actuator comprising:

a central housing defining an aperture for passage of a pushrod;

said pushrod selectively extending through said central aperture;

an outer housing connected to said central housing to define an emergency chamber;

an actuator member moving with said pushrod;

a power spring selectively moving said actuator member and said pushrod outwardly of said central aperture;

a release tool for selectively caging said power spring and preventing movement of said power spring to move said pushrod through said aperture, said release tool being moveable between fully caged and fully released positions; and an indicator movable separately from said push rod for providing an indication of when said release tool is fully released.

2. An actuator as recited in claim 1, wherein said indicator extends outwardly to provide a visual indication when said release tool has not been fully released, and is moved inwardly when said release bolt has been fully released.

3. An actuator as recited in claim 2, wherein said release tool includes a threaded member positioned outwardly of said outer housing, said threaded member moving a caging member within said outer housing to capture said actuator member and cage said power spring.

4. An actuator as recited in claim 3, wherein said caging member is a nut that is moved axially by said threaded member.

5. A spring brake actuator comprising:

a central housing defining an aperture for passage of a pushrod;

a pushrod selectively extending through said aperture;

an outer housing connected to said central housing to define an emergency chamber;

an actuator member moving with said pushrod;

a power spring selectively moving said actuator member and said pushrod outwardly of said aperture;

a release tool including a threaded member positioned outwardly of said outer housing, said threaded member being rotatable in a first direction to move a caging member axially within said outer housing to capture said actuator member and said power spring, said threaded member not moving axially outwardly of said outer housing as said caging member captures said actuator member and said power spring, and said threaded member being rotatable in a reverse direction to cause said caging member to move to release said actuator member and said power spring; and an indicator movable separate from said push rod providing an indication of when said caging member has been fully released.

6. An actuator as recited in claim 5, wherein said indicator provides a visual indication of when said caging member is not fully released by extending outwardly of said outer housing, said indicator member being pulled into said outer housing when said caging member is fully released.

7. An actuator as recited in claim 6, wherein said caging member is a nut which is moved axially by rotation of said threaded member.

8. An actuator as recited in claim 7, wherein said nut pulls a surface of said indicator inwardly when said nut is at a fully released position.

9. An actuator as recited in claim 8, wherein an indicator spring biases said indicator outwardly when said nut is not fully released.

10. An actuator as recited in claim 9, wherein said indicator includes a piston biased outwardly by said indicator spring, and which is connected to said surface which is contacted by said nut.

11. An actuator as recited in claim 10, wherein said threaded member is connected to an externally threaded portion, said nut being moved along said externally threaded surface, and said indicator member being received within said externally threaded member.

12. An actuator as recited in claim 11, wherein said indicator spring is biased off a stop surface within said externally threaded member.

13. An actuator as recited in claim 5, wherein said actuator member is a piston.

14. A spring brake actuator comprising:

a central housing defining an aperture for passage of a pushrod;

a pushrod selectively extending through said aperture;

an outer housing connected to said central housing to define an emergency chamber;

an actuator member moving with said pushrod;

a power spring selectively moving said actuator member and said pushrod outwardly of said aperture;

a release tool including an outer threaded member to be rotated to cage said power spring, said outer threaded member rotating an externally threaded portion, and a nut threaded on said externally threaded portion and being constrained against rotation such that upon rotation of said externally threaded member, said nut moves axially within said spring brake actuator, said nut being moveable between a fully released and a fully caged position, said nut contacting a surface of said actuator member to cage said power spring, and said nut being moveable away from said surface of said actuator member to release said power spring; and an indicator movable separate from said push rod providing an indication of when said caging member has been fully released.

15. An actuator as recited in claim 14, wherein said indicator is biased outwardly of said threaded member when said nut is not fully released, said nut pulling said indicator inwardly when said nut is at a fully released position such that said indicator is no longer visible outwardly of said actuator.

16. An actuator as recited in claim 15, wherein said indicator is received within said externally threaded member.

17. An actuator as recited in claim 16, wherein an indicator spring biases said indicator outwardly when said nut has not contacted said indicator and pulled said indicator member inwardly.

18. An actuator as recited in claim 17, wherein said indicator spring reacts off a stop surface formed within said externally threaded member to bias said indicator outwardly.

19. An actuator as recited in claim 14, wherein said actuator member is a piston.

20. An actuator as recited in claim 19, wherein said stop surface on said actuator member is a radially inwardly extending ledge which is contacted by said nut.

* * * * *